United States Patent
Lexilus et al.

(10) Patent No.: US 12,228,045 B2
(45) Date of Patent: Feb. 18, 2025

(54) METHOD FOR REPAIRING AN END PLATE OF A TURBOMACHINE ROTOR

(71) Applicant: SAFRAN AIRCRAFT ENGINES, Paris (FR)

(72) Inventors: Jean-Hilaire Lexilus, Moissy-Cramayel (FR); Cédric Nicolas Bot, Moissy-Cramayel (FR); Patrick Jean-Louis Reghezza, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/264,969

(22) PCT Filed: Feb. 9, 2022

(86) PCT No.: PCT/FR2022/050234
§ 371 (c)(1),
(2) Date: Aug. 10, 2023

(87) PCT Pub. No.: WO2022/171957
PCT Pub. Date: Aug. 18, 2022

(65) Prior Publication Data
US 2024/0110482 A1    Apr. 4, 2024

(30) Foreign Application Priority Data
Feb. 11, 2021   (FR) ........................ 2101307

(51) Int. Cl.
*F01D 5/02* (2006.01)
*B23P 6/00* (2006.01)
*F01D 5/30* (2006.01)

(52) U.S. Cl.
CPC .............. *F01D 5/027* (2013.01); *B23P 6/002* (2013.01); *F01D 5/02* (2013.01); *F01D 5/30* (2013.01);
(Continued)

(58) Field of Classification Search
CPC ... F01D 5/027; F01D 5/02; F01D 5/30; F01D 5/005; F01D 5/3015; B23P 6/002;
(Continued)

(56) References Cited

U.S. PATENT DOCUMENTS

| | | | |
|---|---|---|---|
| 8,888,458 B2 | 11/2014 | Billings et al. | |
| 2007/0059164 A1 | 3/2007 | Brault et al. | |
| 2011/0099810 A1* | 5/2011 | Stankowski | F01D 5/005 29/888 |

FOREIGN PATENT DOCUMENTS

| | | | |
|---|---|---|---|
| FR | 3 001 515 A1 | 8/2014 | |
| FR | 3 084 697 A1 | 2/2020 | |
| FR | 3 102 205 A1 | 4/2021 | |

OTHER PUBLICATIONS

International Search Report & Written Opinion issued Jul. 11, 2022 in PCT/FR2022/050234, filed on Feb. 9, 2022, citing documents 1-2 & 15-16 therein, 16 pages.
(Continued)

*Primary Examiner* — Moshe Wilensky
(74) *Attorney, Agent, or Firm* — Oblon, McClelland, Maier & Neustadt, L.L.P.

(57) ABSTRACT

A method for repairing an end plate of a turbomachine rotor, the end plate including a crown having at least two collar fastening holes and at least one balancing-weight fastening hole located between the two collar fastening holes, each collar fastening hole being equipped with a crimped nut, the crown having a damaged portion between two collar fastening holes, the method including the steps of removing the two crimped nuts located on either side of the damage;
(Continued)

removing the damaged crown portion, for example by machining; putting in place a strip in the form of a crown portion closing off the removed crown portion, the strip having at least one balancing-weight fastening hole and two mounting holes; fastening the strip to the crown with two crimped nuts, which penetrate the mounting holes, by crimping each nut in a collar fastening hole.

4 Claims, 6 Drawing Sheets

(52) U.S. Cl.
CPC ...... *F05D 2220/32* (2013.01); *F05D 2230/80* (2013.01); *F05D 2240/20* (2013.01)

(58) Field of Classification Search
CPC .... B23P 6/005; B23P 15/006; F05D 2220/32; F05D 2220/36; F05D 2230/80; F05D 2240/20
See application file for complete search history.

(56) References Cited

OTHER PUBLICATIONS

Office Action issued Sep. 10, 2024, in corresponding French Patent Application No. 22 707 807.8-1004, 22 pages.

\* cited by examiner

METHOD FOR REPAIRING AN END PLATE OF A TURBOMACHINE ROTOR

TECHNICAL FIELD

The invention relates to the repair of an end plate of a turbomachine rotor, such as a turbojet fan-disc end plate.

PRIOR ART

Figure 1:
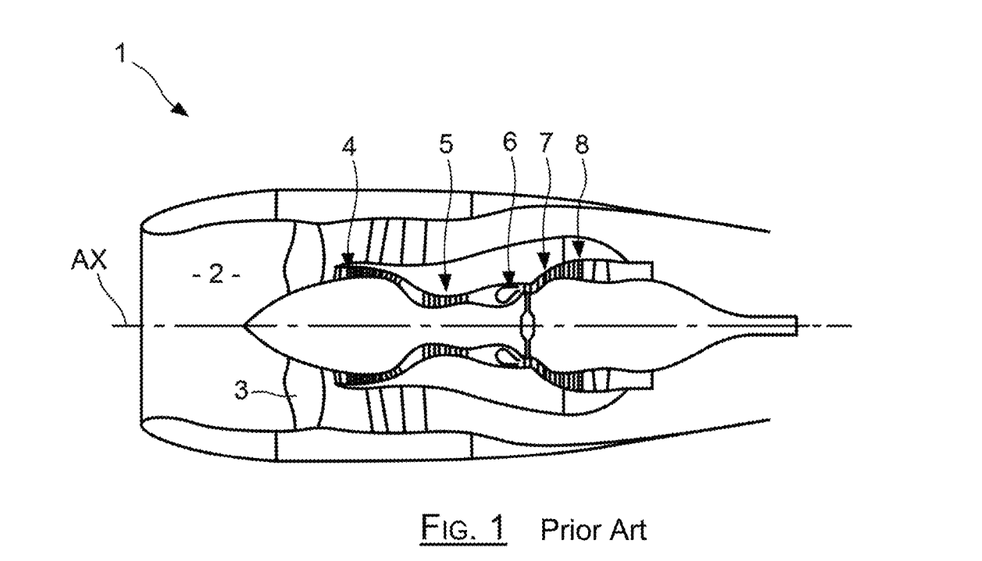
FIG. 1 is a longitudinal sectional view of a known turbojet engine.

In a turbojet engine, given the reference numeral 1 in FIG. 1, the air enters an intake duct 2 to pass through a fan including a series of rotating blades 3 before splitting into a central primary flow and a secondary flow encircling the primary flow.

The primary flow is compressed by low-pressure 4 and high-pressure 5 compressors before reaching a combustion chamber 6, after which it is expanded by passing through a high-pressure turbine 7 and a low-pressure turbine 8, before being discharged while generating an auxiliary thrust. The secondary flow for its part is directly propelled by the fan to generate a main thrust.

Figure 2:
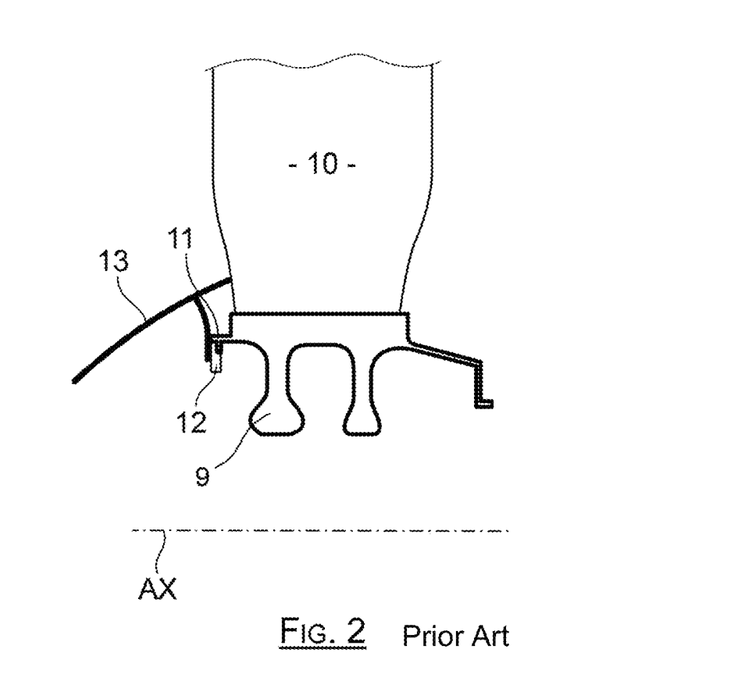
FIG. 2 is a longitudinal sectional view of a fan disc with a blade portion carried by this disc.

As can be seen on FIG. 2, the fan 3 of such a turbojet engine includes a disc 9 forming part of a rotor turning about a longitudinal axis AX, and which carries a set of blades radially distributed at its circumference, such as the blade 10.

This disc 9 includes an upstream end plate 11 carrying firstly balancing weights 12, and secondly a plate 13 providing axial locking of the blades. The plate 13 is secured to the end plate by means of screws engaged in nuts crimped in the upstream end plate 11, whereas the balance weights are secured to this end plate by riveting.

During maintenance operations, it happens that dismantling the balance weights leads to locally damaging the end plate that carries them, because the attachment of these balance weights to the end plate by riveting is problematic for disconnecting the latter. The end plate or ring furthermore locally has only a slight thickness at the balance weights, so as to facilitate securing thereof by riveting, which increases the risk of damage during dismantling, during which high forces may be exerted.

The damage may result in degradation of the riveting holes making them unusable, and in a local deformation of the wall constituting the end plate.

In such a case, it is necessary to replace the whole of the disc, because it is a complex part made from alloy, so that it is not possible to envisage repairing such a part.

The invention aims to provide a solution making it possible to provide a repair of a disc end plate damaged at a balancing weight fixing.

DESCRIPTION OF THE INVENTION

For this purpose, the object of the invention is a method for repairing a ring of a turbomachine-rotor end plate, this ring including at least two plate-securing holes and at least one balance-weight securing hole located between the two plate-securing holes, each plate-securing hole being equipped with a crimped nut, the ring including a damaged portion between two plate-securing holes, the method including the steps of:
   removing the two crimped nuts;
   removing the damaged ring portion, for example by machining;
   attaching a bar in the form of a ring portion making up for the removed ring portion, this bar including at least one balance-weight securing hole, and two mounting holes;
   attaching the bar to the ring by means of two crimped nuts passing through the mounting holes while each being crimped in a plate securing hole.

This solution thus makes it possible to repair the end-plate ring instead of having to replace the whole of the rotor component carrying this end plate.

The invention also relates to a method thus defined, wherein the same operations are implemented at a point on the ring located at 180° from the damaged ring portion to compensate for the imbalance introduced at the damaged portion.

The invention also relates to a method thus defined, wherein the bar is attached to a downstream face of the ring with respect to the direction of circulation of fluid in the turbomachine.

The invention also relates to a method thus defined, wherein the crimped nuts used for securing the bar have a greater length than the crimped nuts initially mounted on the ring.

The invention also relates to a method thus defined, wherein the bar has a form including a scallop.

The invention also relates to a turbomachine including a rotor having an end plate repaired in accordance with the method thus defined.

The invention further relates to a turbojet engine comprising a turbomachine thus defined.

DETAILED DESCRIPTION OF PARTICULAR EMBODIMENTS

Figures 3, 4:
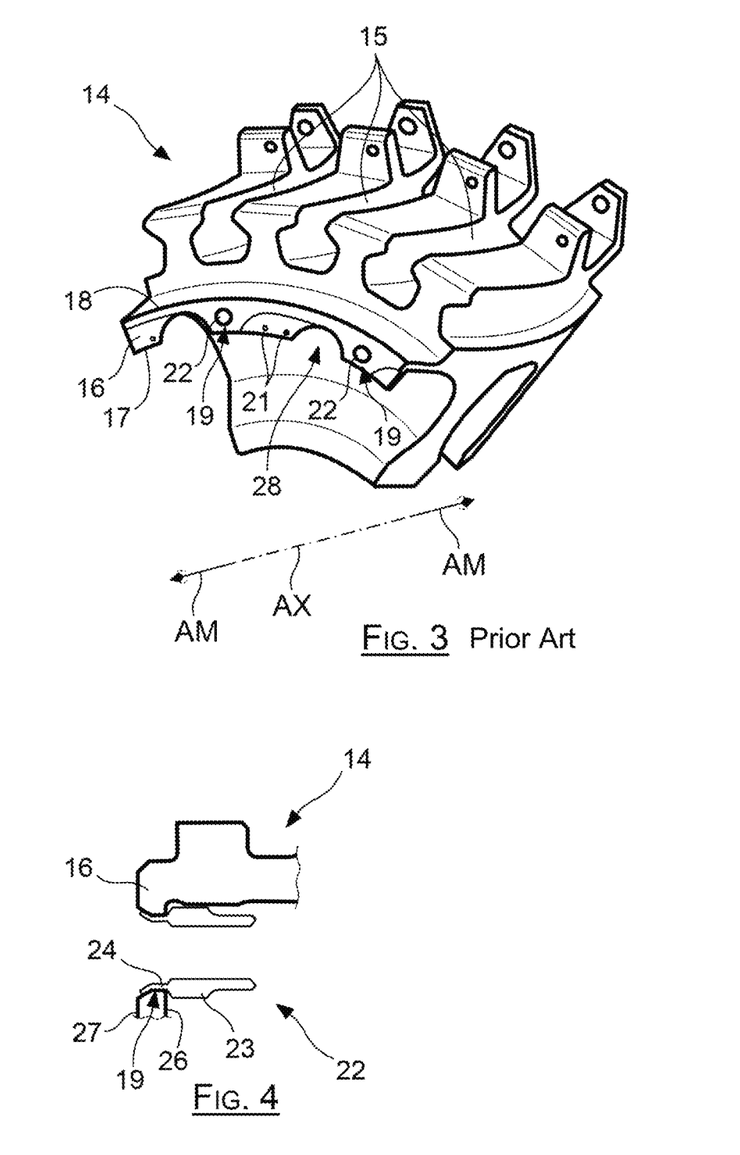
FIG. 3 is a perspective view of a fan disc portion that has to be repaired in accordance with the invention.
FIG. 4 is a view in longitudinal cross section showing a crimped nut equipping an upstream ring of the fan disc that has to be repaired.

On FIG. 3, a portion of a fan disc 14 extending around an axis AX includes, at its external periphery, a series of bases 15 intended each to receive a blade root to hold it, these bases 15 being regularly distributed at the external periphery of the disc 14. Each base 15 has a general form corresponding to the female part of a connection of the dovetail type, and extends in a direction substantially parallel to the axis AX.

This fan disc 14 includes, at its upstream face, a substantially planar upstream ring 16, forming an end plate, extending perpendicularly to the axis AX. This ring is located upstream with respect to the direction of circulation of the flow in the engine in service, upstream and downstream being referenced respectively by AM and AV on the figures.

This ring 16 is delimited externally by a circular external edge 17 and internally by an essentially circular internal edge 18, while being connected to the body of the disc 14 by means of a cylindrical portion extending its external edge 17.

As can be seen on FIG. 3, this ring 16 includes holes 19, not shown, for securing a locking plate, and holes 21 for securing balance weights that are installed during the balancing of the whole of the rotor, of which this disc 14 forms part.

Each hole 19 is equipped with a corresponding crimped nut 22. As shown on FIG. 4, such a crimped nut 22 includes a body or head 23 extended by a skirt 24 formed in a single piece with the head. This skirt 24 is engaged and clamped in the hole 21 so as to secure the nut 22 to the hole 19 that carries it: the head 23 is situated on the downstream side of the ring and the skirt 24 passes through this ring to extend inside the hole towards the upstream face 27.

In the case of the disc 14, the upstream ring 16 is located at a distance from the body of this disc 14, a space thus being available between the downstream face 26 of the ring and the disc body, the plate for its part coming to be applied against the upstream face 27 of this ring 16.

Thus, and as can be seen on FIG. 4, the head 23 of the crimped nut 22 is located on the downstream side of the ring 16, so that the upstream face 27 of this ring is left clear to receive the plate, the crimping skirt 24 having, along the axis AX, a thickness slightly less than that of the ring 16.

The holes 19 are regularly distributed all around the axis AX while being formed in the ring 16. Between each pair of consecutive holes for securing the plate 19, the ring includes two balance-weight securing holes 21 and an internal scallop 28 formed in the internal edge of the ring.

When the balance weights carried by the holes 21 are removed, the portion of the ring 16 carrying the securing holes 21 may be damaged, to the point that it is no longer possible to once again secure a balance weight thereto.

Figure 5:
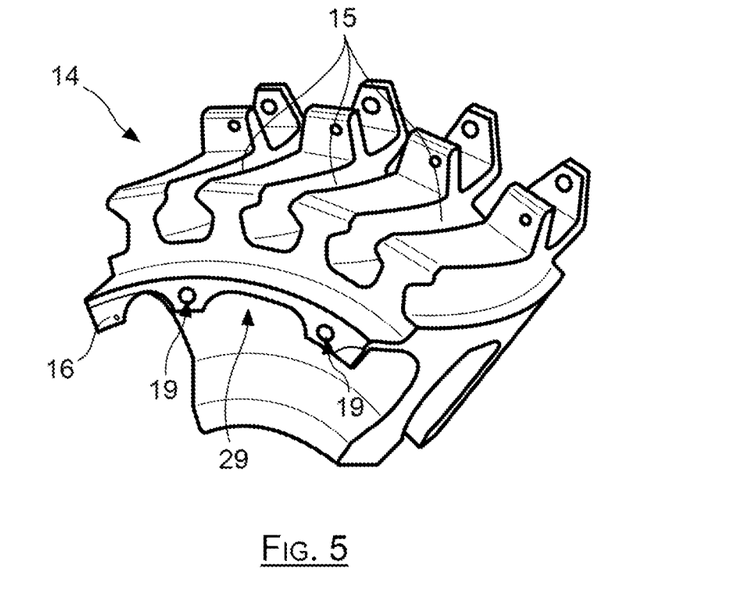
FIG. 5 is a perspective view of a fan disc portion after machining during repair thereof in accordance with the invention.

According to the invention, a machining operation or the like is then implemented to remove this damaged ring portion, by forming an extended scallop 29 in the internal edge of the ring 16, as can be seen on FIG. 5. This operation thus makes it possible to fully remove all the damaged ring portion, without detriment to the securing of the upstream plate, because of the fact that the parts of the ring including the holes 19 remain present. In a complementary manner, the crimped nuts 22 equipping these holes 19 are removed, so as to entirely leave clear the region for securing the balance weights.

Figure 6:
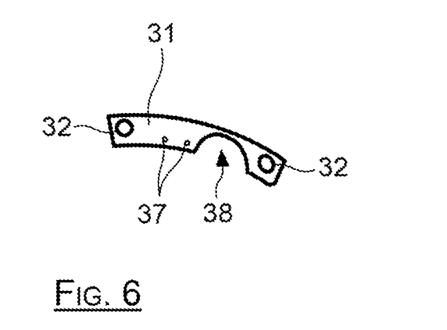
FIG. 6 is an overall view of a repair bar according to the invention.
Figure 7:
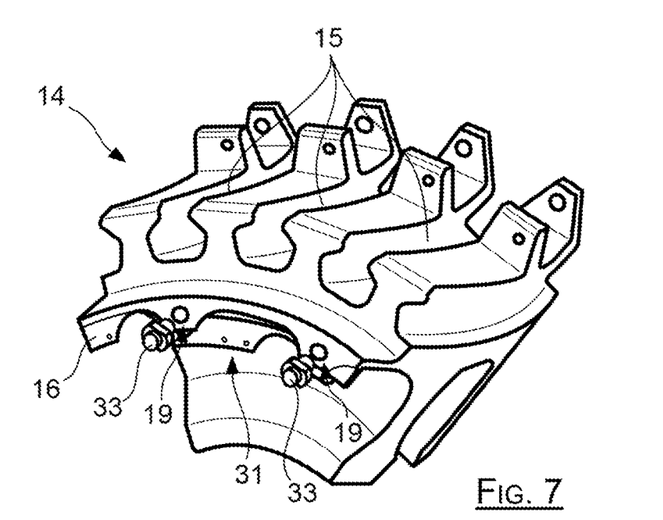
FIG. 7 is a perspective view of a rotor disc portion when a repair bar is added in accordance with the invention.
Figure 8:
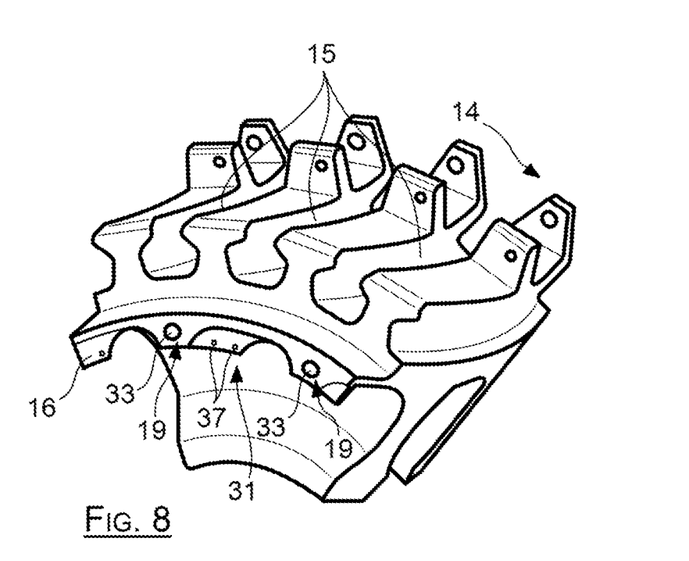
FIG. 8 is a perspective view of a rotor disc portion repaired in accordance with the invention.

Once these operations have been implemented, a bar 31 in the form of a ring portion, shown alone on FIG. 6, is placed against the downstream face 26 of the ring 16, as can be seen on FIG. 7, so that, once it is placed, it covers the region that was removed, as can be seen clearly on FIG. 8.

As can be seen on FIGS. 6 and 7, this bar 31 in the form of a ring portion includes at its ends two mounting holes 32, and has a length corresponding to the distance separating two holes for securing the plate 19. Thus, the two holes 32 for mounting the bar 31 coincide with the two holes for securing the plate 19 located on either side of the ring portion 16 that was removed.

As can be seen on FIG. 6, the bar 31 has overall the form of a portion of the ring 16 while having an angular extent slightly greater than the angle separating the holes 19, measured around the axis AX. This ring portion 16 thus makes it possible to replace the damaged portion that was removed while being secured to the ring at its ends.

Figure 11:
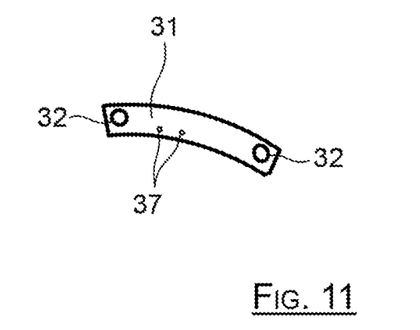
FIG. 11 is an overall view of a variant repair bar according to the invention.

The bar 31 may have various forms, similar to that of the removed ring portion: in the example in FIG. 6 it includes a scallop 38 at its internal edge, enabling other elements to be secured to the rotor. Depending on the configuration, this bar may also not have a scallop, as on the example in FIG. 11.

Figure 10:
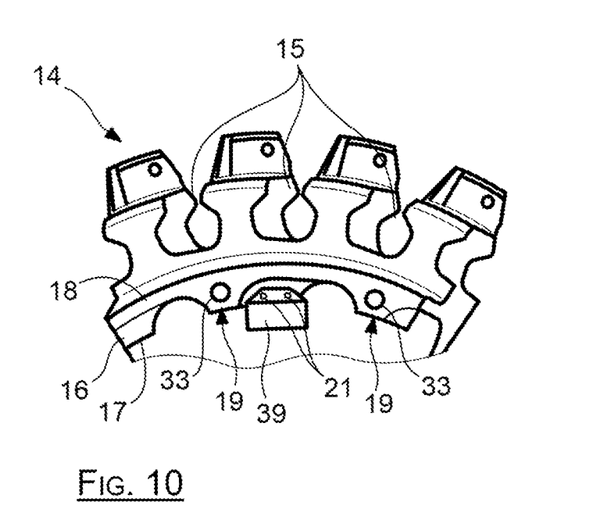
FIG. 10 is a front view of a portion of a disc repaired according to the invention and carrying a balance weight.

The securing of the replacement bar 31 to the ring 16 is provided, as illustrated on FIG. 10, by two crimped repair nuts 33 that are slightly different from the initial crimped nuts 22. Each crimped repair nut 33 also includes a head 34 extended by a crimping skirt 36, but this crimping skirt 36 is longer than the skirt 24 of the initial crimped nuts 22. The skirt thus has a length, along the axis AX, that corresponds to the thickness of the ring 16 plus the thickness of the bar 31.

Figure 9:
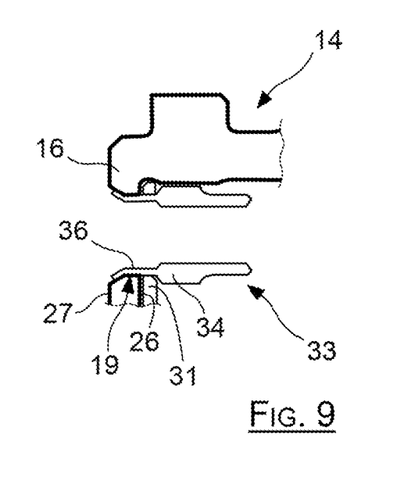
FIG. 9 is a longitudinal sectional view of a crimped nut used for implementing the repair according to the invention, with the repair bar according to the invention installed.

The bar 31 is secured by first of all putting it in position against the downstream face 26, then engaging each crimped nut 33 conjointly in a hole 32 in the bar and in a corresponding hole 19 in the ring 16. Once the assembly is in place, the two nuts 33 are crimped, for example by means of a suitable clamp, in order to splay the upstream end of the skirts of these nuts so as to lock them in the holes that carry them, in accordance with the configuration in FIG. 9.

In a complementary manner, and as can be seen in FIGS. 6 to 8, the bar 31 includes two holes for securing the balance weight 37 and a scallop 38, which are placed at the same positions respectively as the securing holes 21 and the scallop 28 of the initial ring 16.

Once the assembly is in place, as illustrated on FIG. 8, a new balance weight 39 can be secured by riveting in the holes 37 of the repair bar, which corresponds to the configuration illustrated on FIG. 10.

After the balance weight is secured, the upstream plate can be attached to the disc, while being secured thereto by means of screws passing through it in order each to be screwed in a corresponding crimped nut carried by the ring 16.

As will be understood, the tightening of the screws securing the attached plate in the crimped nuts ensures complete securing of the bar to the ring while pressing it effectively against the downstream face 26 of the ring.

In practice, when a balance-weight securing portion is damaged on the ring 16, a repair is carried out as explained above at the damage location in order to enable a new balance weight to be secured. In a complementary manner, the same repair is carried out (removal of a ring portion and addition of a bar to replace the removed portion) in the region of the ring diametrically opposite to that of the damage, to ensure that the repair does not compromise the balancing of the disc.

In other words, the difference in weight caused by adding a bar at the damaged location is compensated for by adding another bar in the region diametrically opposite to the ring (at 180°), including if this other region is not damaged. Thus, it is not necessary to carry out a new balancing of the disc because the repair does not introduce any imbalance.

As will be understood, if several regions of the ring are damaged, the repair is applied to each damaged region, and to each region located at 180° from a damaged region.

In general terms, the invention makes it possible to restore the interface of the disc with the balance weight by mechanical repair of the part of the damaged end plate without having to change the disc. The attached bar is advantageously manufactured from the same material as the disc, so as to preserve unchanged mechanical characteristics.

The invention claimed is:

1. A method for repairing a ring of a turbomachine rotor end plate, said ring comprising two plate-securing holes and a balance-weight securing hole located between the two plate-securing holes, each plate-securing hole being equipped with a crimped nut, the ring including a damaged portion between the two plate-securing holes, the method comprising:

removing the two crimped nuts;

removing the damaged ring portion;

attaching a bar in a form of a ring portion making up for the removed ring portion, said bar including a balance-weight fixing hole, and two mounting holes; and attaching the bar to the ring with two crimped nuts passing through the two mounting holes while each being crimped in a plate-attaching hole, wherein the crimped nuts used for securing the bar have a greater length than the crimped nuts initially mounted on the ring.

2. The repair method according to claim 1, wherein same operations are implemented at a point on the ring located at 180° from the damaged ring portion to compensate for an imbalance introduced at the damaged portion.

3. The method according to claim 1, wherein the bar is attached to a downstream face of the ring with respect to a direction of circulation of fluid in a turbomachine.

4. The method according to claim 1, wherein the bar has a form including a scallop.

* * * * *